US010333984B2

(12) United States Patent
Best et al.

(10) Patent No.: US 10,333,984 B2
(45) Date of Patent: Jun. 25, 2019

(54) OPTIMIZING DATA REDUCTION, SECURITY AND ENCRYPTION REQUIREMENTS IN A NETWORK ENVIRONMENT

(71) Applicant: International Business Machines Corporation, Armonk, NY (US)

(72) Inventors: Nathan B. Best, Apex, NC (US); Mikael H. Lindström, Sollentuna (SE); Kurt A. Rybczyk, Waterbury, CT (US); Daniela Kern Mainieri Trevisan, Porto Alegre (BR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 97 days.

(21) Appl. No.: 15/437,562

(22) Filed: Feb. 21, 2017

(65) Prior Publication Data
US 2018/0241777 A1  Aug. 23, 2018

(51) Int. Cl.
*G06F 16/23* (2019.01)
*H04L 29/06* (2006.01)
(Continued)

(52) U.S. Cl.
CPC .......... *H04L 63/20* (2013.01); *G06F 16/2365* (2019.01); *G06F 16/24578* (2019.01);
(Continued)

(58) Field of Classification Search
None
See application file for complete search history.

(56) References Cited

U.S. PATENT DOCUMENTS 7,219,230 B2 * 5/2007 Riedel ................ G06F 21/6218
707/999.2
7,631,184 B2 * 12/2009 Ryan .................. G06F 21/6227
713/160
(Continued)

OTHER PUBLICATIONS

Orlando et al. IBM ProtecTIER Implementation and Best Practices Guide. IBM Redbooks, 2016. Available from https://books.google.com/books?isbn=0738441694.
(Continued)

*Primary Examiner* — Michael R Vaughan
(74) *Attorney, Agent, or Firm* — Garg Law Firm, PLLC; Rakesh Garg; Maeve Carpenter

(57) ABSTRACT

A specification of a target network environment including target devices is received. The specification includes an identity of each of the target devices and a compression feature requirement, a deduplication feature requirement, and an encryption feature requirement of the target network environment. A performance parameter corresponding to each of the requirements is computed based on the specification. Possible combinations of the target devices and enabled features in the target devices are determined to meet the specification. Each possible combination is compared to a knowledge base to determine a performance reduction for each of the enabled features based upon the performance parameters. A desired combination of the enabled features is determined from the possible combinations for each target device based upon the comparison. The desired combination includes a combination having a performance reduction that does not exceed a threshold value for data reduction in one or more enabled features.

19 Claims, 5 Drawing Sheets

(51) Int. Cl.
*G06F 16/2457* (2019.01)
*H04L 29/08* (2006.01)
*G06F 21/62* (2013.01)

(52) U.S. Cl.
CPC ...... *G06F 21/6218* (2013.01); *H04L 63/0428* (2013.01); *H04L 67/1097* (2013.01)

(56) References Cited

U.S. PATENT DOCUMENTS

| | | | |
|---|---|---|---|
| 8,239,584 B1* | 8/2012 | Rabe | G06F 3/0605 710/8 |
| 8,407,190 B2 | 3/2013 | Prahlad et al. | |
| 8,572,163 B1 | 10/2013 | Bromely et al. | |
| 9,384,207 B2 | 7/2016 | Provenzano et al. | |
| 9,473,297 B2 | 10/2016 | Glider et al. | |
| 10,007,459 B2* | 6/2018 | Fernandez | G06F 3/0634 |
| 10,067,704 B2* | 9/2018 | Huang | G06F 3/0635 |
| 2006/0230014 A1 | 10/2006 | Kedem et al. | |
| 2007/0064736 A1* | 3/2007 | Miriyala | H04L 43/02 370/469 |
| 2014/0006465 A1* | 1/2014 | Davis | G06F 17/30194 707/827 |
| 2018/0375795 A1* | 12/2018 | Lee | H04L 47/823 |

OTHER PUBLICATIONS

Alvarez, "NetApp deduplication for FAS and V-Series deployment and implementation guide." Technical Report TR-3505 (2011).
Ismail et al., "Architecture of scalable backup service for private cloud." Open Systems (ICOS), 2013 IEEE Conference on. IEEE, 2013.
Alatorre et al. "On selective compression of primary data." Network and Service Management (CNSM), 2015 11th International Conference on. IEEE, 2015.
Qin et al., "The Design and Implementation of a Rekeying-aware Encrypted Deduplication Storage System." arXiv preprint arXiv:1607. 08388 (2016).

* cited by examiner

OPTIMIZING DATA REDUCTION, SECURITY AND ENCRYPTION REQUIREMENTS IN A NETWORK ENVIRONMENT

TECHNICAL FIELD

The present invention relates generally to a method, system, and computer program product for optimizing data reduction, security, and encryption requirements in a network environment. More particularly, the present invention relates to a method, system, and computer program product for optimizing data reduction, security and encryption requirements in a network environment by determining an optimal combination of encryption and data reduction techniques to enable on a number of devices of the network.

BACKGROUND

Data encryption, data deduplication and data compression are features that are often desirable to enable in a number of devices, such as storage devices and servers, within a network. Encryption is a process of encoding data or other information in such a way as to prevent unauthorized access to the data or information. Often, cryptographic methods are used to encode the data in an unreadable format that is only readable if the correct key is used to decode the encrypted data.

Data deduplication is a process in which the retaining of redundant copies of repeating data is eliminated in order to reduce storage overhead. Data deduplication may be used to ensure that only one unique instance of data is retained on storage media or a network. Redundant data may be replaced with a pointer to the unique copy of the data that is being stored. For example, in an electronic mail system the same file attachment may be contained in a number of emails. Rather than store every copy of the attachment separately, data duplication may be used to store only one instance of the attachment with a reference back to the same stored copy in each of the emails. Data compression is a process of reducing the size of data so that it may be represented in a manner so that it consumes less storage space.

Various devices within a computer network may be capable of performing one or more of compression operations, encryption operations, and deduplication operations on data. However, not all devices within the network may be capable of performing these operations at the same time. In addition, it may be efficient for a particular device to perform the operations as opposed to another device in the network.

SUMMARY

The illustrative embodiments provide a method, system, and computer program product. An embodiment includes a method that includes receiving a specification of a target network environment including a plurality of target devices. The specification includes an identity of each of the plurality of target devices and a compression feature requirement, a deduplication feature requirement, and an encryption feature requirement of the target network environment. The method further includes computing, using a processor and a memory, a performance parameter corresponding to each of the compression feature requirement, the deduplication feature requirement, and the encryption feature requirement based on the specification of the target network environment. The method further includes determining possible combinations of the plurality of target devices and enabled features in the plurality of target devices to meet the specification. The enabled features including one or more of a compression feature, a deduplication feature, and an encryption feature.

In an embodiment, the method further includes comparing each possible combination to a knowledge base to determine, for each possible combination, a performance reduction for each of the enabled features based upon the performance parameters. The method further includes determining a desired combination of the enabled features from the possible combinations for each target device based upon the comparison. The desired combination of enabled features for each target device includes a combination having a performance reduction that does not exceed a threshold value for data reduction in one or more enabled features.

Another embodiment further includes configuring each of the plurality of target devices according to the determined desired combination.

In another embodiment, the desired combination is based upon at least one of implications of enabling each feature on each combination of target devices, dependencies between each of the target devices, and data reduction threshold values for each feature.

Another embodiment further includes ranking each possible combination by one or more of a data reduction capacity for the possible combination.

Another embodiment includes ranking each possible combination by the performance hit for each of the enabled features for the possible combination.

In another embodiment, the knowledge base includes historical information of a plurality of previously deployed devices of a previously deployed network environment.

In another embodiment, the historical information includes an identity of the plurality of previously deployed network devices and performance data related to one or more of a compression feature, deduplication feature and encryption feature that are enabled for each previously deployed device.

In another embodiment, the historical information includes data reduction threshold values for each of the deployed devices.

An embodiment includes a computer usable program product comprising one or more computer-readable storage devices, and program instructions stored on at least one of the one or more storage devices. The stored program instructions include program instructions to receive a specification of a target network environment including a plurality of target devices. The specification includes an identity of each of the plurality of target devices and a compression feature requirement, a deduplication feature requirement, and an encryption feature requirement of the target network environment. The stored program instructions further include program instructions to compute, using a processor and a memory, a performance parameter corresponding to each of the compression feature requirement, the deduplication feature requirement, and the encryption feature requirement based on the specification of the target network environment. The stored program instructions further include program instructions to determine possible combinations of the plurality of target devices and enabled features in the plurality of target devices to meet the specification. The enabled features include one or more of a compression feature, a deduplication feature, and an encryption feature.

In an embodiment, the stored program instructions further include program instructions to compare each possible combination to a knowledge base to determine, for each possible combination, a performance reduction for each of the enabled features based upon the performance parameters. The stored program instructions further include program instructions to determine a desired combination of the enabled features from the possible combinations for each target device based upon the comparison. The desired combination of enabled features for each target device includes a combination having a performance reduction that does not exceed a threshold value for data reduction in one or more enabled features.

In an embodiment, the computer usable code is stored in a computer readable storage device in a data processing system, and the computer usable code is transferred over a network from a remote data processing system.

In another embodiment, the computer usable code is stored in a computer readable storage device in a server data processing system, and the computer usable code is downloaded over a network to a remote data processing system for use in a computer readable storage device associated with the remote data processing system.

An embodiment includes computer system comprising one or more processors, one or more computer-readable memories, and one or more computer-readable storage devices, and program instructions stored on at least one of the one or more storage devices for execution by at least one of the one or more processors via at least one of the one or more memories. The stored program instructions include program instructions to receive a specification of a target network environment including a plurality of target devices, the specification including an identity of each of the plurality of target devices and a compression feature requirement, a deduplication feature requirement, and an encryption feature requirement of the target network environment. The stored program instructions further include program instructions to compute, using a processor and a memory, a performance parameter corresponding to each of the compression feature requirement, the deduplication feature requirement, and the encryption feature requirement based on the specification of the target network environment.

In an embodiment, the stored program instructions further include program instructions to determine possible combinations of the plurality of target devices and enabled features in the plurality of target devices to meet the specification. The enabled features include one or more of a compression feature, a deduplication feature, and an encryption feature. The stored program instructions further include program instructions to compare each possible combination to a knowledge base to determine, for each possible combination, a performance reduction for each of the enabled features based upon the performance parameters. The stored program instructions further include program instructions to determine a desired combination of the enabled features from the possible combinations for each target device based upon the comparison. The desired combination of enabled features for each target device includes a combination having a performance reduction that does not exceed a threshold value for data reduction in one or more enabled features.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
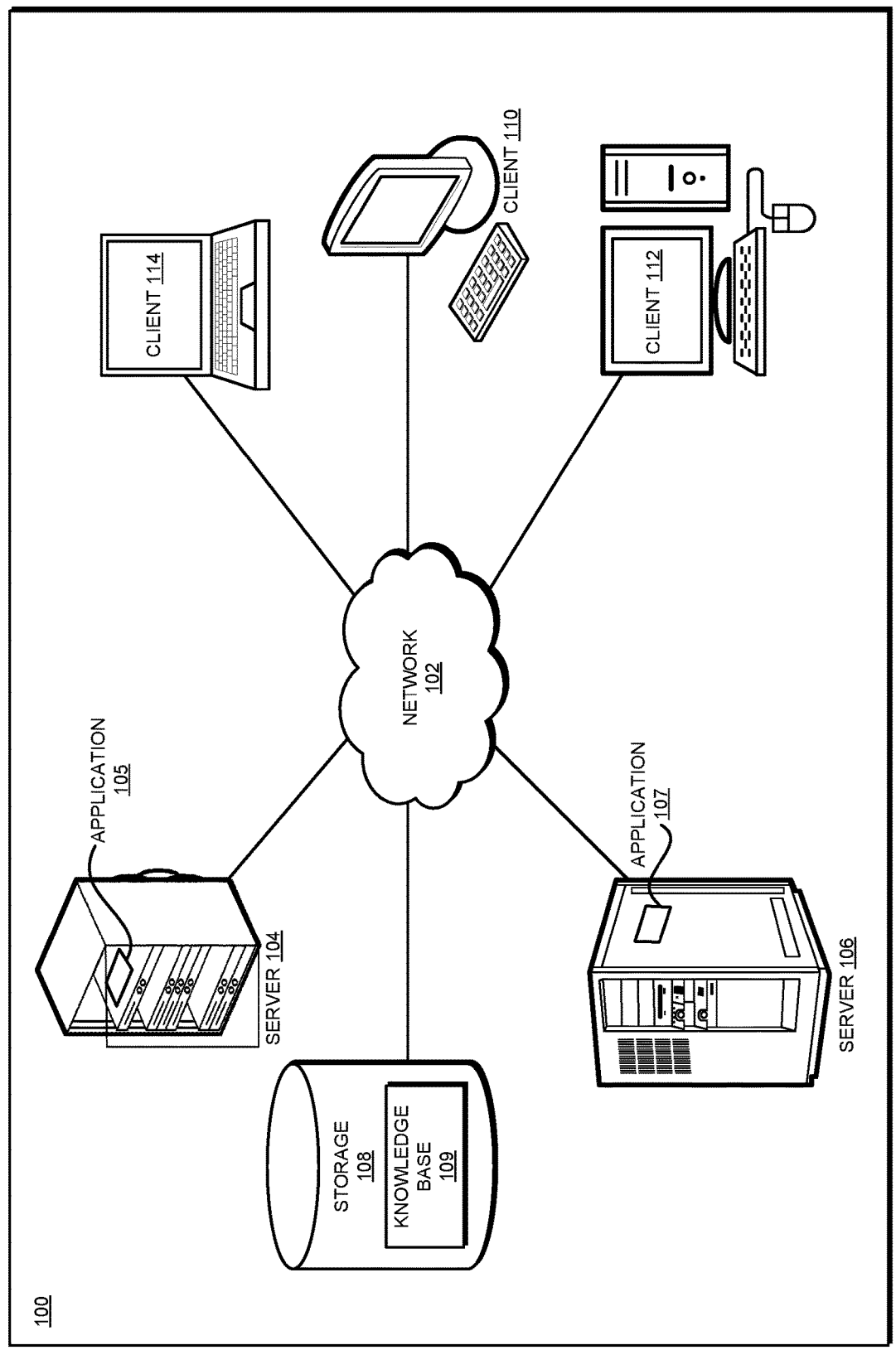
FIG. 1 depicts a block diagram of a network of data processing systems in which illustrative embodiments may be implemented.

The illustrative embodiments described herein generally relate to optimizing data reduction, security and encryption requirements in a network environment by determining an optimal combination of encryption and data reduction techniques to enable on a number of devices of the network. One or more embodiments provide for identifying encryption and data reduction requirements within a network environment, comparing the requirements with historical data from a database in which the historical data includes data related to the historical performance of each of a plurality of devices when one or more of data compression features, data deduplication features, and data encryption features are enabled on each device. In one or more embodiments, the comparison is used to determine an optimal combination of the features that should be enabled on the devices to determine the most efficient usage of storage and network performance will still meeting security requirements.

In current conventional systems encryption, deduplication, and compression features cannot be enabled on all components of a network infrastructure at the same time without resulting in inefficient usage of storage and performance resources. The usage of one feature impacts other features and certain dependencies must be taken into account when defining where each feature will be enabled on each device. Currently, different levels of the network infrastructure may support different features. For example, at a server/application level only compression features and encryption features may be supported. At a storage systems level, compression features, encryption features and deduplication features may be supported. At a virtual tape libraries level, encryption features and deduplication features may be supported. At a physical tape level, compression features and encryption features may be supported. At a backup software level, compression features, encryption features, and deduplication features may be supported. At a network level, compression features, encryption features, and deduplication features may be supported. Even if encryption features, deduplication features, and compression features are available on all components of the network infrastructure, performing such operations at each level, or at multiple levels is duplicative, computationally expensive, or both. Therefore optimizing data reduction techniques while still meeting security requirements such as encryption is needed.

One or more embodiments provide a technique for efficient application of encryption and data reduction features to the available devices/components in a network. To efficiently apply the compression, encryption, data reduction features, or some combination thereof, at least one embodiment takes into consideration the available devices/components in a network, the available features of each device, and performance parameters related to each available feature for a device/component. In particular embodiments, the performance data for a particular device includes one or more of deduplication rates, compression rates, encryption overhead, server/application data type, amount of data, backup retention, bandwidth between network locations, etc.

In one or more embodiments, the algorithm defines which performance parameters are to be compared based on a target architecture components and requirements, and determine a combination of features to be enabled on each component to optimize storage utilization and satisfy encryption requirements.

In one embodiment, historical information is gathered from one or more previously deployed network environments to build a knowledge base. In one or more embodiments, the historical information includes an identification of components/devices of the deployed network environment such as storage systems, servers, backup servers, virtual tape libraries, physical tape libraries, network devices, and backup software components. In the embodiment, the historical information further includes relationship between components of the network architecture. For example, if a Device x is used as a backup repository of a System Y, this relationship is contained within the historical information. In the embodiment, the historical information still further includes information identifying for one or more the deployed devices of the deployed network environment whether each of the data reduction features (i.e., compression and deduplication) and encryption features are enabled for the particular device. In a particular embodiment, the historical information includes a matrix or table including device identifiers of deployed devices and associated enabled features.

In one or more embodiments, the historical information still further includes performance data related to one or more of the compression features, deduplication features and encryption features that are enabled for each deployed device. The performance data may include deduplication rates achieved for the specific configuration/environment, compression rates achieved on the specific configuration/environment, encryption overhead, server/application data type capability, the amount of data stored on a device, backup retention data for a device, and available bandwidth between deployed devices in the deployed network environment.

In particular embodiments, one or more threshold values for data reduction (i.e., compression and deduplication) are identified for each of the deployed devices. In one embodiment, the threshold values are identified by a user. In another embodiment, the threshold values are determined by a software application residing on a server. In particular embodiments, the thresholds for data reduction are based upon published best practices or other documentation. In one example, a specific device may have a best practice of not compressing data if the compression savings are not higher than 45%. In at least one embodiment, the threshold values consider the features to be enabled on each device.

An application implementing an embodiment described herein resides on the server and identifies performance implications and dependencies of applying each of the compression features, deduplication features and encryption features on each deployed device within the network. In various embodiments, if a certain feature is enabled on a particular device it will impact the efficiency of another feature on another device in the network. Accordingly, the application utilizes the implications in determining whether particular features are to be enabled on a particular device.

An application implementing another embodiment receives specifications of a target network environment including a plurality of target devices and the compression, deduplication, and encryption feature requirements associated with one or more of the target devices. The application determines the target devices present in the target network environment and the compression, deduplication, and encryption feature requirements for a target device.

In at least one embodiment, the application determines which performance parameters are to be compared to the knowledge base based on a type of solution to be provided by the target network environment and its requirements. For example, if the target network environment is to provide only a storage solution, then deduplication performance parameters may not be selected and some implications between devices may not be applicable. After defining which performance parameters from the target network environment are to be compared to the knowledge base, the application gathers the historical information from the knowledge base for the target devices within the target network environment such as rates and implications applicable to them. In one or more embodiments, the application gathers threshold values applicable to the target devices from the knowledge base.

In one embodiment, the application builds a table for the target devices including compression rates, deduplication rates, dependencies between devices, threshold values, and system requirements. In at least one embodiment, the application prepares rates, thresholds, and implications for the target devices. In one or more embodiments, the application generates possible combinations of features enabled per device in which each combination is provided with a weight based on rates, thresholds, and dependencies. In particular embodiments, the application ranks the combinations by their data reduction capability. In one or more embodiments, the application determines an optimal combination of enabled features per device taking into account the network architecture and the connections and dependencies between components/devices. In at least one embodiment, the application configures one or more of the target components/devices according to the determined optimal combination of enabled features per target device.

The illustrative embodiments are described with respect to certain types of data reduction and encryption processes, network devices, transmissions, validations, responses, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
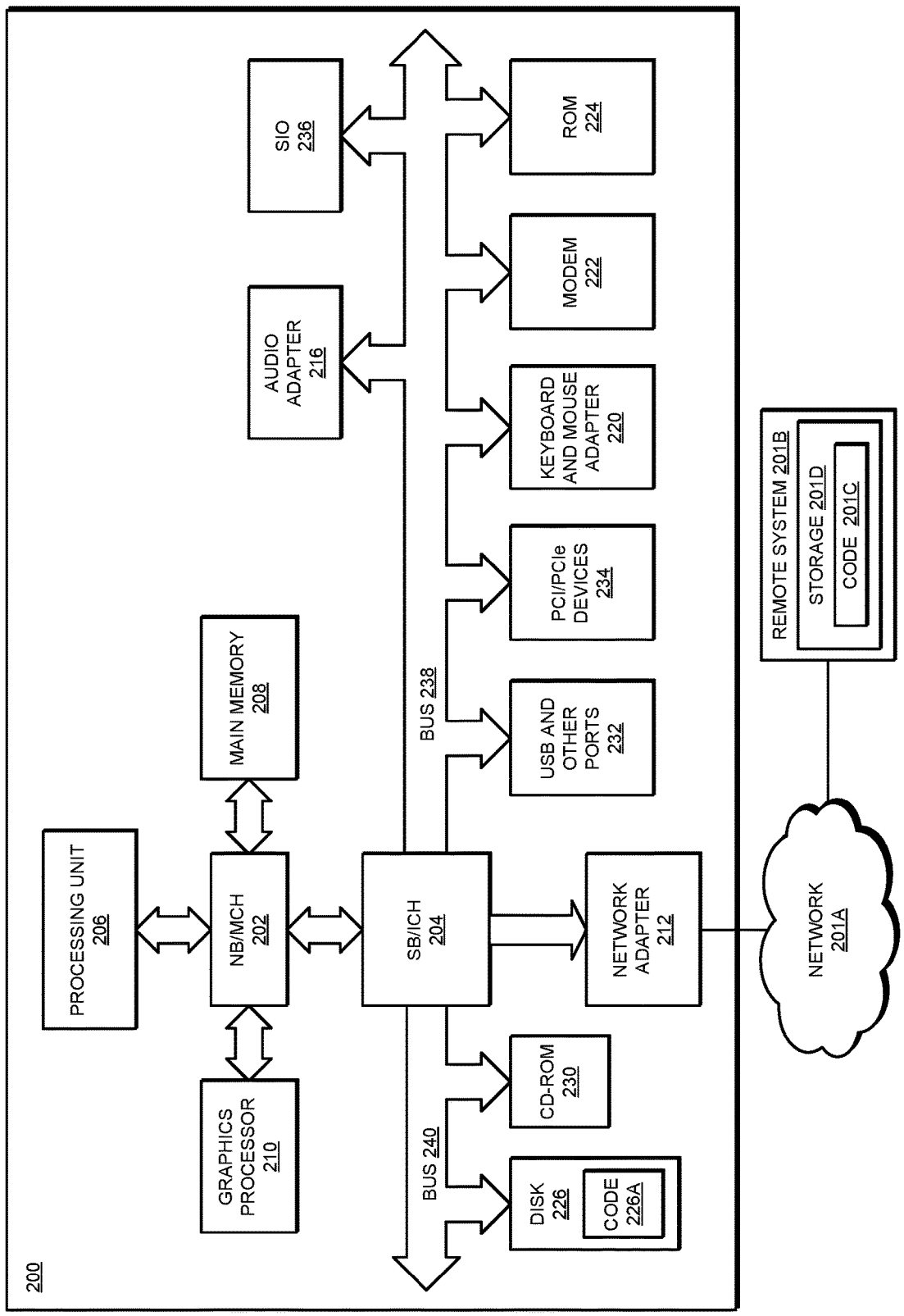
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. In one or more embodiments, storage 108 may be configured to store historical performance data for one or more components/ devices within a knowledge base 109. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Application 105 of server 104 implements an embodiment of an algorithm for optimizing data reduction, security, and encryption requirements in a network environment as described herein. Application 107 implements one or more data storage, encryption, deduplication, and/or compression processes as described herein with respect to various embodiments.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein in which computer usable program code or instructions implementing the processes of the illustrative embodiments may be located. Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105 and 107 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
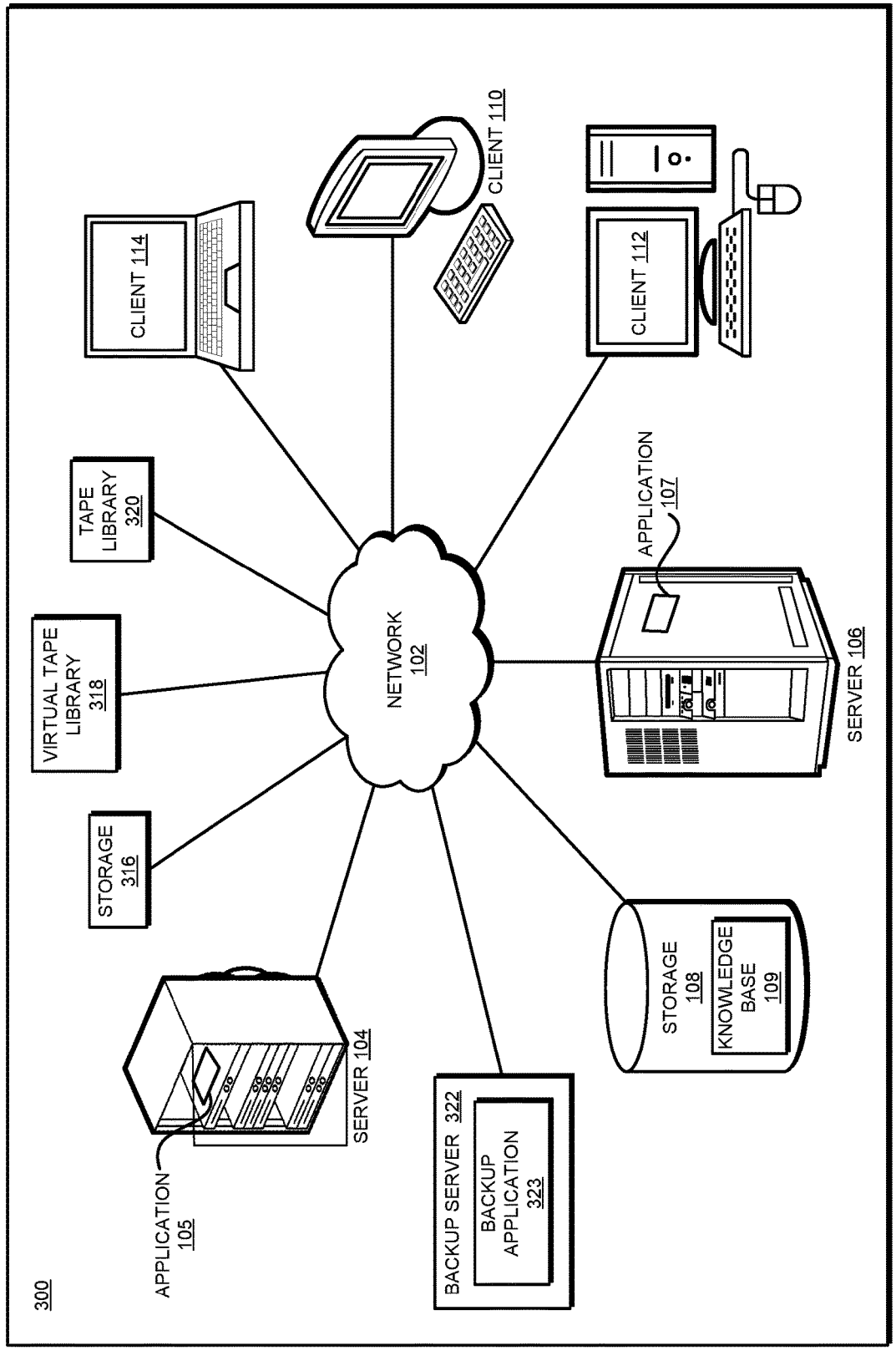
FIG. 3 depicts a block diagram of a network for optimizing data reduction, security, and encryption requirements in which illustrative embodiments may be implemented.

With respect to FIG. 3, this figure depicts a block diagram of a network for optimizing data reduction, security, and encryption requirements in which illustrative embodiments may be implemented. Network environment 300 is a network of computers in which the illustrative embodiments may be implemented. Network environment 300 includes network 102, server 104, application 105, server 106, application 107, storage 108, knowledge base 109, client 110, client 112, and client 114 which are previously described with respect to FIG. 1. Network 102 is the medium used to provide communications links between various devices and computers connected together within network environment 300. Application 105 of server 104 implements an embodiment of a technique for optimizing data reduction, security, and encryption requirements in a network environment as described herein. Application 107 implements one or more data storage, encryption, deduplication, and/or compression processes as described herein with respect to various embodiments.

Network environment 300 further includes storage device 316, virtual tape library 318, and physical tape library 320 all functioning as storage devices to store data within network environment 300. A virtual tape library is a data storage virtualization technology used typically for backup and recovery purposes. Network environment 300 further includes a backup server 322 including a backup application 323. Backup application 323 of backup server 322 is configured to perform one or more data backup operations to enable backup of data stored in one or more storage devices within network environment 300. In accordance with various embodiments, server 104, server 106, storage device 108, storage device 316, virtual tape library 318, and tape library 320 are configured to allow enabling of one or more of compression features, deduplication features, and encryption features.

In accordance with one or more embodiments, application 105 is configured to gather historic information from one or more deployed environments and store the historic information within knowledge base 104. In one or more embodiments, application 105 is further configured to identify threshold values for compression features and deduplication features. In particular embodiments, the threshold values are determined based upon established best practices or other documentation. In at least one embodiments, application 105 is further configured to identify implications and dependencies of applying compression features and deduplication features on each component/device of one or more network architecture layers.

Table 1 describes an example of historical data within knowledge base 109 that includes compression feature performance data.

TABLE 1

| Component | Compression Rate | Compression Reduction/ Dependency | Second Component - Compression Enabled |
|---|---|---|---|
| Storage Manager Server | 10% | −5% | Storage System #1 |
| Storage Manager Server | 10% | −2% | Storage System #2 |
| Storage Manager Server | 10% | −3% | Storage Manager Client |

In Table 1, the Component column identifies a first component/device within the network, and the Compression Rate column indicates a compression rate for the component/device. The Second Component—Compression Enabled column identifies a second component/device having the compression feature enabled. The Compression Hit/Dependency column indicates a performance reduction that will be incurred if compression is also enabled on the second component/device due to the dependency between the first component/device and the second component/device. In the example of Table 1, the smallest performance reduction is obtained by enabling the compression feature on the Storage Manager server and Storage System #2.

Table 2 describes an example of historical data within knowledge base 109 that includes deduplication feature performance data.

TABLE 2

| Component | Deduplication Rate | Deduplication Reduction/ Dependency | Second Component - Deduplication Enabled |
|---|---|---|---|
| Storage Manager Server | 30% | 0% | Storage System #1 |
| Storage Manager Server | 30% | 0% | Storage System #2 |
| Storage Manager Server | 30% | −10% | Storage Manager Client |

In Table 2, the Component column identifies a first component/device within the network, and the Deduplication Rate column indicates a deduplication rate for the component/device. The Second Component—Deduplication Enabled column identifies a second component/device having the deduplication feature enabled. The Deduplication Hit/Dependency column indicates a performance reduction that will be incurred if deduplication is also enabled on the second component/device due to the dependency between the first component/device and the second component/device. In the example of Table 2, the smallest performance reduction is obtained by enabling the deduplication feature on the Storage Manager server and either Storage System #1 or Storage System #2.

Table 3 describes an example of historical data within knowledge base 109 that includes encryption feature performance data.

TABLE 3

| Component | Encryption Capable | Encryption Reduction/ Dependency | Second Component - Encryption Enabled |
|---|---|---|---|
| Storage Manager Server | Yes | 0% | Storage System #1 |
| Storage Manager Server | Yes | 0% | Storage System #2 |
| Storage Manager Server | Yes | Not compatible | Storage Manager Client |

In Table 3, the Component column identifies a first component/device within the network, and the Encryption Capable column indicates whether the component/device supports the encryption feature. The Second Component—Encryption Enabled column identifies a second component/device having the encryption feature enabled. The Encryption Hit/Dependency column indicates a performance reduction that will be incurred if encryption is also enabled on the second component/device due to the dependency between the first component/device and the second component/device. In the example of Table 3, the smallest performance hit is obtained by enabling the encryption feature on the Storage Manager server and either Storage System #1 or Storage System #2 as the encryption feature is not compatible with a combination of the Storage Manager Server and the Storage Manager Client.

In one or more embodiments, application 105 is further configured to receive a target network environment and/or solution and its associated requirements. In a particular embodiment, application 105 defines performance parameters for a plurality of target devices to be compared based on a type of the proposed target network environment and/or proposed solution. In one or more embodiments, application 105 uses an algorithm to compare the defined performance parameters with the historical information stored in knowledge base 109 to generate possible combinations of features to be enabled for each target device. In particular embodiments, the performance parameters may include one or more of an identity of the target devices, compression rates, deduplication rates, encryption capabilities, dependencies between devices, threshold values, and implications for enabled features among target devices.

Table 4 describes an example of a target environment requirement.

TABLE 4

| Component Combination | Encryption Enabled | Deduplication Enabled | Compression Enabled | Average Data Reduction |
|---|---|---|---|---|
| Storage Manager Server, Storage System #1 | Storage Manager Server | | | |
| Storage Manager Server, Storage System #1 | Storage Manager Server | Storage Manager Server | | |
| Storage Manager Server, Storage System #1 | Storage Manager Server | Storage Manager Server | Storage Manager Server | |
| Storage Manager Server, Storage System #1 | Storage Manager Server | | Storage Manager Server | |
| Storage Manager Server, Storage System #1 | Storage System #1 | | | |
| Storage Manager Server, Storage System #1 | Storage System #1 | Storage Manager Server | | |
| Storage Manager Server, Storage System #1 | Storage System #1 | Storage Manager Server | Storage Manager Server | |
| Storage Manager Server, Storage System #1 | Storage System #1 | | Storage System #1 | |
| Storage Manager Server, Storage System #1 | Storage System #1 | Storage Manager Server | Storage System #1 | |
| Storage Manager Server, Storage System #1 | Storage Manager Server, Storage System #1 | | | |
| Storage Manager Server, Storage System #1 | Storage Manager Server, Storage System #1 | Storage Manager Server | | |
| Storage Manager Server, Storage System #1 | Storage Manager Server | Storage Manager Server | Storage Manager Server | |
| Storage Manager Server, Storage System #1 | Storage Manager Server | | Storage Manager Server | |

In Table 4, the Component Combination column identifies a combination of components/devices within the target network environment that are dependent upon one another in operation. The Encryption Enabled column identifies any components/devices for which encryption is enabled. The Deduplication Enabled column identifies any components/devices for which deduplication is enabled. The Compression Enabled column identifies any components/devices for which compression is enabled. The average data reduction column indicates the expected data reduction from use of one or more of the deduplication feature and compression feature in the indicated component/device combination that is determined by an embodiment.

Application 105 is further configured to rank the combination by their respective data reduction capabilities and generate a final result including an optimal combination of enabled features per device. Application is further configured to configures one or more of the devices according to the determined optimal combination of enabled features per device.

Among other uses, network environment 300 may be used for implementing a client-server environment in which the illustrative embodiments may be implemented. A client-server environment enables software applications and data to be distributed across a network such that an application functions by using the interactivity between a client data processing system and a server data processing system. Network environment 300 may also employ a service oriented architecture where interoperable software components distributed across a network may be packaged together as coherent business applications. Network environment 300 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 4:
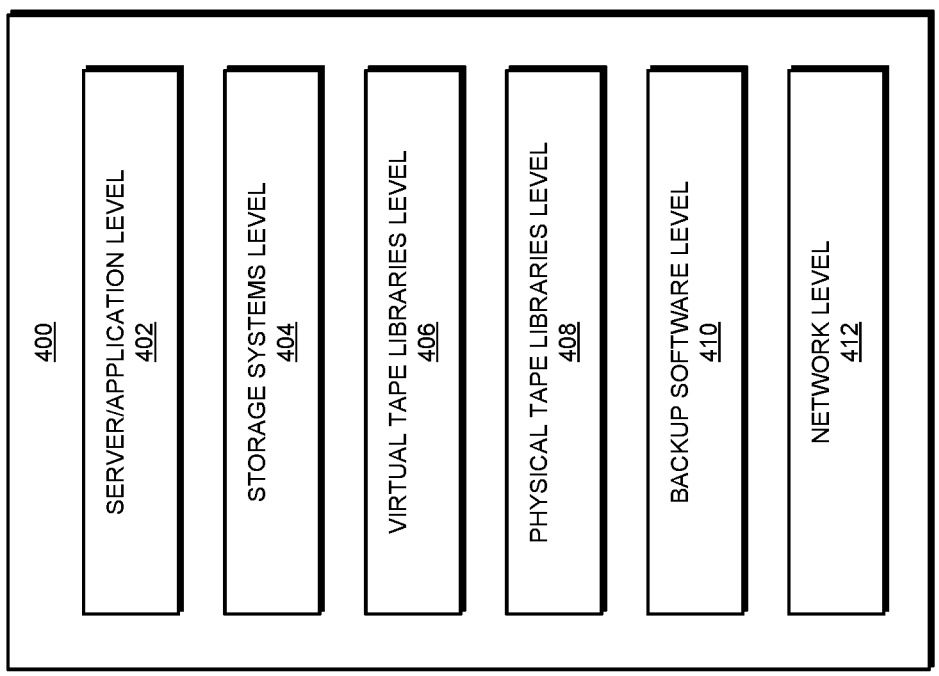
FIG. 4 depicts example network infrastructure level architecture in accordance with an illustrative embodiment.

With respect to FIG. 4, this figures depicts example network infrastructure level architecture 400 in accordance with an illustrative embodiment. The architecture 400 includes a server/application level 402, a storage systems level 404, virtual tape libraries level 406, a physical tape libraries level 408, a backup software level 410, and network level 412. Server/application level 402 includes servers and applications which are capable of enabling one or more of compression, deduplication, and encryption features on data processed by the server or application. Storage systems level 404 includes storage systems and storage devices which are capable of enabling one or more of compression, deduplication, and encryption features on data stored by the storage system or storage device.

Virtual tape libraries level 406 includes one or more virtual tape libraries embodied in virtualized data storage utilizing one or more storage devices which are capable of enabling one or more of compression, deduplication, and encryption features on data stored by the virtual tape libraries. Physical tape libraries level 408 includes one or more physical tape drives which are capable of enabling one or more of compression, deduplication, and encryption features on data stored by the physical tape drives.

Backup software level 410 includes one or more backup software applications configured to backup data stored on one or more storage devices to one or more other storage devices. In particular embodiments, the backup software applications may be configured to backup data stored by or associated with clients 110, 112, 114. The one or more backup software applications are capable of enabling one or more of compression, deduplication, and encryption features on data stored by the backup software application. Network level 412 includes network layer components and/or devices that are capable of enabling one or more of compression, deduplication, and encryption features on data transmitted or received by the component and/or device.

Figure 5:
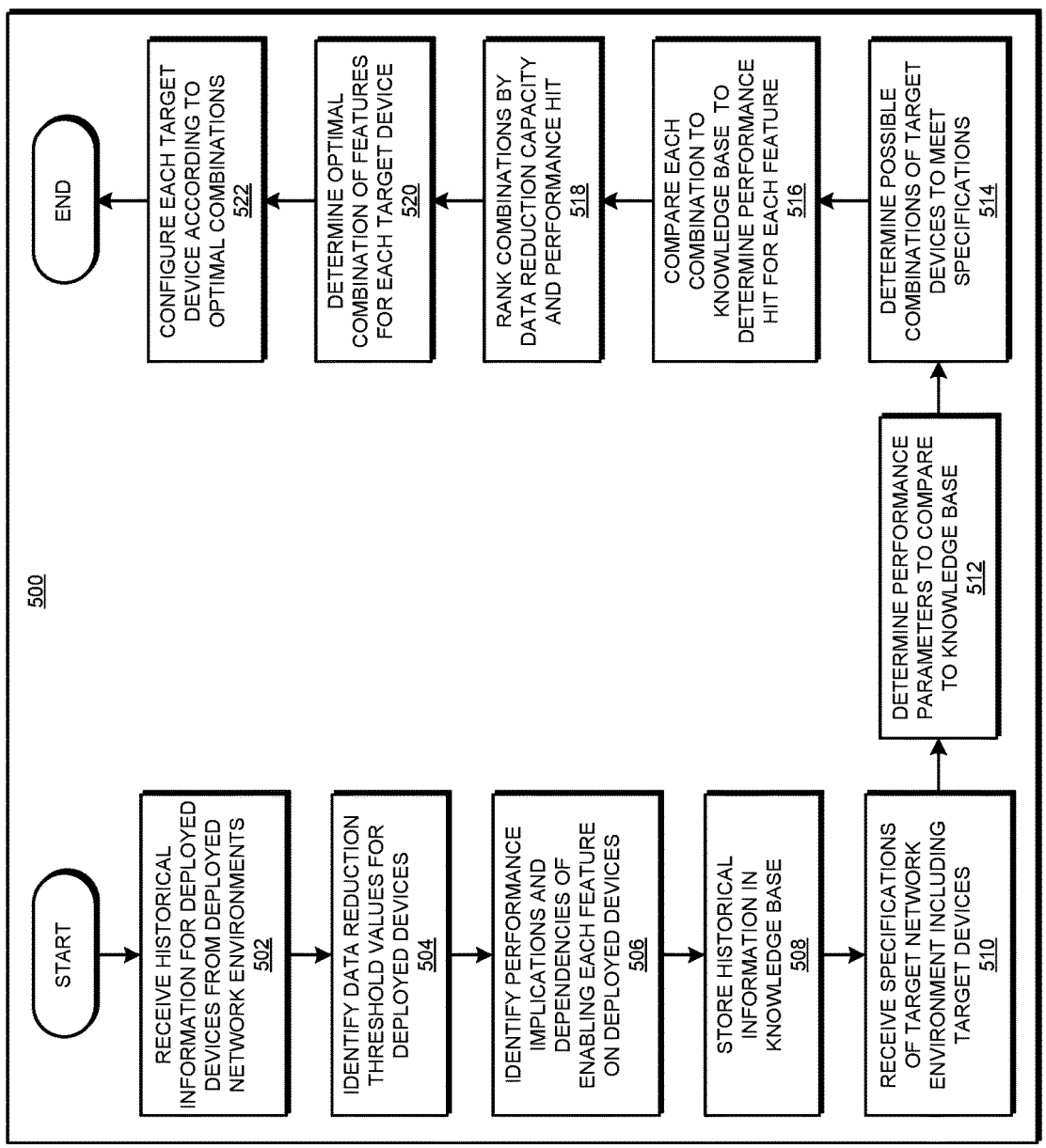
FIG. 5 depicts a flowchart of an example process for optimizing data reduction, security, and encryption requirements in a network environment in accordance with an illustrative embodiment.

With reference to FIG. 5, this figure depicts a flowchart of an example process for optimizing data reduction, security, and encryption requirements in a network environment in accordance with an illustrative embodiment. In one or more embodiments, process 500 can be implemented in application 105.

In block 502, application 105 receives historical information for a plurality of deployed devices from one or more deployed network environments. In one or more embodiments, the historical information includes an identification of the deployed components/devices of the deployed network environment such as storage systems, servers, backup servers, virtual tape libraries, physical tape libraries, network devices, and backup software components.

In block 504, application 105 determines one or more threshold values for data reduction (i.e., compression and deduplication) for each of the deployed devices. In one embodiment, the threshold values are identified by a user. In another embodiment, the threshold values are determined by application 105 residing on server 104. In other embodiments, the threshold values for data reduction are based upon best practices or other documentation.

In block 506, application 105 identifies performance implications and dependencies of enabling each feature (e.g., a compression feature, a deduplication feature, and an encryption feature) on each of the deployed devices. In various embodiments, if a certain feature is enabled on a particular deployed device, such enablement may impact the efficiency of another feature on another deployed device in the deployed network.

In at least one embodiment, the historical information further includes relationship between deployed devices of the deployed network architecture. For example, if a Device x is used as a backup repository of a System Y, this relationship is contained within the historical information. In at least one embodiment, the historical information still further includes information identifying for one or more the deployed devices of the deployed network environment whether each of the data reduction features (i.e., compression and deduplication) and encryption features are enabled for the particular device. In a particular embodiment, the historical information includes a matrix or table including device identifiers of deployed devices and associated enabled features.

In at least one embodiment, the historical information still further includes performance data related to one or more of the compression features, deduplication features and encryption features that are enabled for each deployed device. The performance data may include deduplication rates achieved for the specific configuration/environment, compression rates achieved on the specific configuration/environment, encryption overhead, server/application data type capability, the amount of data stored on a device, backup retention data for a device, and available bandwidth between deployed devices in the deployed network environment.

In block 508, application 105 stores the historical information in knowledge base 109 of storage device 108. In one or more embodiments, the historical information includes the identification of the deployed devices, the data reduction threshold values, data indicative of the dependencies between the deployed devices, performance implications of enabling each feature (e.g., compression features, deduplication features, and performance features) on the deployed devices, and performance data related to enabling one or more of the features on each of the deployed devices.

In block 510, application 105 receives specifications of a target network environment including a plurality of target devices. The specifications includes an identity of each of the plurality of target devices and compression feature, deduplication feature, and encryption feature requirements of the target network environment.

In block 512, application 105 determines which performance parameters are to be compared to the knowledge base based on the specifications of the target network environment such as a type of solution to be provided by the target network environment and its requirements. For example, if the target network environment is to provide only a storage solution, then deduplication performance parameters may not be selected and some implications between devices may not be applicable.

In block 514, application 105 determines one or more possible combinations of target devices to meet the specification of the target network environment. In a particular embodiment, application 105 builds a table for the target devices including compression rates, deduplication rates, dependencies between devices, threshold values, and system requirements.

In block 516, application 105 compares each combination to the historical information in knowledge base 109 to determine the performance reduction or change that will be incurred for enabling each feature for each device. In particular embodiments, the performance hit may include one or more of a reduction in storage capacity, reduction in compression ratio, reduction in deduplication ratio, reduction in network bandwidth, or reduction in other network resources.

In block 518, application 105 ranks each combination by data reduction capacity and/or the particular performance hit for the combination. In block 520, application 105 determines an optimal or other desired combination of enabled features for each target device from the ranked combinations. In particular embodiments, an optimal and/or desired combination of enabled features for each target device includes a combination having performance reductions that do not exceed threshold values for data reduction in one or more features while still meeting the requirements of the specification. In block 522, application 105 configures each of the target devices according to the determined optimal and/or combination of enabled features for each target device. In one or more embodiments, application 105 may not itself configure the target devices but may instead generate an instruction to configure, cause such an instruction to be generated, become the basis for the generation of the instruction, or cause the configuration to occur as a result of 520. Process 500 is ended thereafter.

Thus, a computer implemented method, system or apparatus, and computer program product are provided in the illustrative embodiments for optimizing data reduction, security, and encryption requirements in a network environment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving a specification of a target network environment including a plurality of target devices, the specification including an identity of each of the plurality of target devices and a compression feature requirement, a deduplication feature requirement, and an encryption feature requirement of the target network environment;
computing, using a processor and a memory, a performance parameter corresponding to each of the compression feature requirement, the deduplication feature requirement, and the encryption feature requirement based on the specification of the target network environment;
determining possible combinations of the plurality of target devices and enabled features in the plurality of target devices to meet the specification, the enabled features including one or more of a compression feature, a deduplication feature, and an encryption feature;
comparing each possible combination to a knowledge base to determine, for each possible combination, a performance reduction for each of the enabled features based upon the performance parameters;
determining a desired combination of the enabled features from the possible combinations for each target device based upon the comparison, wherein the desired combination of enabled features for each target device includes a combination having a performance reduction that does not exceed a threshold value for data reduction in one or more enabled features; and
configuring each of the plurality of target devices according to the determined desired combination.

2. The method of claim 1, wherein the desired combination is based upon at least one of implications of enabling each feature on each combination of target devices, dependencies between each of the target devices, and data reduction threshold values for each feature.

3. The method of claim 1, further comprising:
ranking each possible combination by one or more of a data reduction capacity for the possible combination.

4. The method of claim 1, further comprising:
ranking each possible combination by the performance hit for each of the enabled features for the possible combination.

5. The method of claim 1, wherein the knowledge base includes historical information of a plurality of previously deployed devices of a previously deployed network environment.

6. The method of claim 5, wherein the historical information includes an identity of the plurality of previously deployed network devices and performance data related to one or more of a compression feature, deduplication feature and encryption feature that are enabled for each previously deployed device.

7. The method of claim 6, wherein the historical information includes data reduction threshold values for each of the deployed devices.

8. A computer usable program product comprising one or more computer-readable storage devices, and program instructions stored on at least one of the one or more storage devices, the stored program instructions comprising:
program instructions to receive a specification of a target network environment including a plurality of target devices, the specification including an identity of each of the plurality of target devices and a compression feature requirement, a deduplication feature requirement, and an encryption feature requirement of the target network environment;
program instructions to compute, using a processor and a memory, a performance parameter corresponding to each of the compression feature requirement, the deduplication feature requirement, and the encryption feature requirement based on the specification of the target network environment;
program instructions to determine possible combinations of the plurality of target devices and enabled features in the plurality of target devices to meet the specification, the enabled features including one or more of a compression feature, a deduplication feature, and an encryption feature;
program instructions to compare each possible combination to a knowledge base to determine, for each possible combination, a performance reduction for each of the enabled features based upon the performance parameters;
program instructions to determine a desired combination of the enabled features from the possible combinations for each target device based upon the comparison, wherein the desired combination of enabled features for each target device includes a combination having a performance reduction that does not exceed a threshold value for data reduction in one or more enabled features; and
program instructions to configure each of the plurality of target devices according to the determined desired combination.

9. The computer usable program product of claim 8, wherein the desired combination is based upon at least one of implications of enabling each feature on each combination of target devices, dependencies between each of the target devices, and data reduction threshold values for each feature.

10. The computer usable program product of claim 8, further comprising:

program instructions to rank each possible combination by one or more of a data reduction capacity for the possible combination.

11. The computer usable program product of claim 8, further comprising:
program instructions to rank each possible combination by the performance hit for each of the enabled features for the possible combination.

12. The computer usable program product of claim 8, wherein the knowledge base includes historical information of a plurality of previously deployed devices of a previously deployed network environment.

13. The computer usable program product of claim 12, wherein the historical information includes an identity of the plurality of previously deployed network devices and performance data related to one or more of a compression feature, deduplication feature and encryption feature that are enabled for each previously deployed device.

14. The computer usable program product of claim 13, wherein the historical information includes data reduction threshold values for each of the deployed devices.

15. The computer usable program product of claim 8, wherein the computer usable code is stored in a computer readable storage device in a data processing system, and wherein the computer usable code is transferred over a network from a remote data processing system.

16. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to receive a specification of a target network environment including a plurality of target devices, the specification including an identity of each of the plurality of target devices and a compression feature requirement, a deduplication feature requirement, and an encryption feature requirement of the target network environment;
program instructions to compute, using a processor and a memory, a performance parameter corresponding to each of the compression feature requirement, the deduplication feature requirement, and the encryption feature requirement based on the specification of the target network environment;
program instructions to determine possible combinations of the plurality of target devices and enabled features in the plurality of target devices to meet the specification, the enabled features including one or more of a compression feature, a deduplication feature, and an encryption feature;
program instructions to compare each possible combination to a knowledge base to determine, for each possible combination, a performance reduction for each of the enabled features based upon the performance parameters;
program instructions to determine a desired combination of the enabled features from the possible combinations for each target device based upon the comparison, wherein the desired combination of enabled features for each target device includes a combination having a performance reduction that does not exceed a threshold value for data reduction in one or more enabled features; and
program instructions to configure each of the plurality of target devices according to the determined desired combination.

18. The computer system of claim 17, the stored program instructions further comprising:
program instructions to rank each possible combination by one or more of a data reduction capacity for the possible combination.

19. The computer system of claim 17, further comprising:
program instructions to rank each possible combination by the performance hit for each of the enabled features for the possible combination.

\* \* \* \* \*